United States Patent [19]

Yoshida

[11] Patent Number: 4,520,412
[45] Date of Patent: May 28, 1985

[54] AUTOSTOP MECHANISM FOR TAPE RECORDER

[75] Inventor: Kobun Yoshida, Saitama, Japan

[73] Assignee: Pioneer Electronic Corporation, Japan

[21] Appl. No.: 413,659

[22] Filed: Sep. 1, 1982

[30] Foreign Application Priority Data

Sep. 2, 1981 [JP] Japan .............................. 56-130483
Sep. 2, 1981 [JP] Japan .............................. 56-130484

[51] Int. Cl.³ ...................... G11B 15/02; G11B 17/02
[52] U.S. Cl. ................................. 360/96.1; 360/96.3; 360/90; 360/137
[58] Field of Search ................... 360/96.1, 96.3, 96.5, 360/90, 93, 70, 105, 137

[56] References Cited

U.S. PATENT DOCUMENTS 4,404,610 9/1983 Koizumi et al. ............... 360/105 X
4,420,783 12/1983 Suezawa et al. ................ 360/90 X Primary Examiner—John H. Wolff
Attorney, Agent, or Firm—Sughrue, Mion, Zinn, Macpeak and Seas

[57] ABSTRACT

A tape recorder of the cassette type is operated by a push button system employing cam surfaces and pins engaging and locking the respective buttons in the operational state. The buttons may be released by a stop mechanism actuated either manually by a push button or automatically by an autostop mechanism when the end of the tape is reached. The autostop mechanism also includes a tape slack prevention device operable to brake a reel of the recorder during pausing.

14 Claims, 6 Drawing Figures

AUTOSTOP MECHANISM FOR TAPE RECORDER

BACKGROUND OF THE INVENTION

This invention relates to an autostop mechanism for automatically stopping the operation of a tape recorder at the end of a cassette tape when the tape recorder is used in a predetermined mode, and more particularly to a mechanism for cancelling the retention of the mode used in the same manner as in the use of a stop mode.

In a conventional autostop mechanism for a tape recorder, the terminal end of the tape of the cassette half is coated with conductive material, and at the end of the tape, the conductive material conducts so as to turn the motor off. But this method is inapplicable if conductive material is not applied to the terminal end portion of the tape, and it is inconvenient in operation in that in the reproduction and recording modes, the head, the pinch roller and so on are operated even if the motor is turned off, so that the cassette cannot be unloaded immediately. Further disadvantageous is the fact that a special mechanism for stopping and starting the motor is required, and it is necessary to connect this mechanism with the mode switching operation mechanism, which results in a complex construction.

This invention also relates to a tape slack preventing apparatus for preventing the tape of the cassette from slackening during operation in a pause mode, and particularly to an apparatus where the inertia of the tape at the time of operation in the pause mode is eliminated by using the braking of a reel arm of an autostop mechanism.

Generally, when a tape recorder is operated in a pause mode, power transmission is cut off by slackening the driving belts of the take-up reel shaft and the capstan, whereby the feed of a tape is temporarily stopped. Accordingly, when the reel shaft and the capstan, which have been rotating, stop suddenly, the tape stretched therebetween is slackened because of remaining inertia, and the positions before and after the pause mode operation are overlapped or are varied, which causes various inconveniences in recording.

SUMMARY OF THE INVENTION

In view of such circumstances, it is an object of this invention to provide an autostop mechanism for a tape recorder which can be assuredly restored to the inactive condition from any mode used, such that when a tape of a cassette half comes to an end, a take-up reel shaft is instantly stopped, turning an autostop arm in two stages by spring force and a rotary cam and releasing a mode switching operation apparatus by a strong movement of the rotary cam in the same manner as in a stop mode operation.

It is a further object of this invention to provide a tape slack preventing apparatus for a tape recorder by employing means applying a predetermined frictional resistance to the reel shaft in an autostop mechanism, and stopping the take-up reel shaft by braking a reel arm added thereto in case of pause mode operation by using the reel arm so as to eliminate slackening caused by the inertia of the tape.

DETAILED DESCRIPTION OF THE PREFERRED EMBODIMENTS

Figure 1:
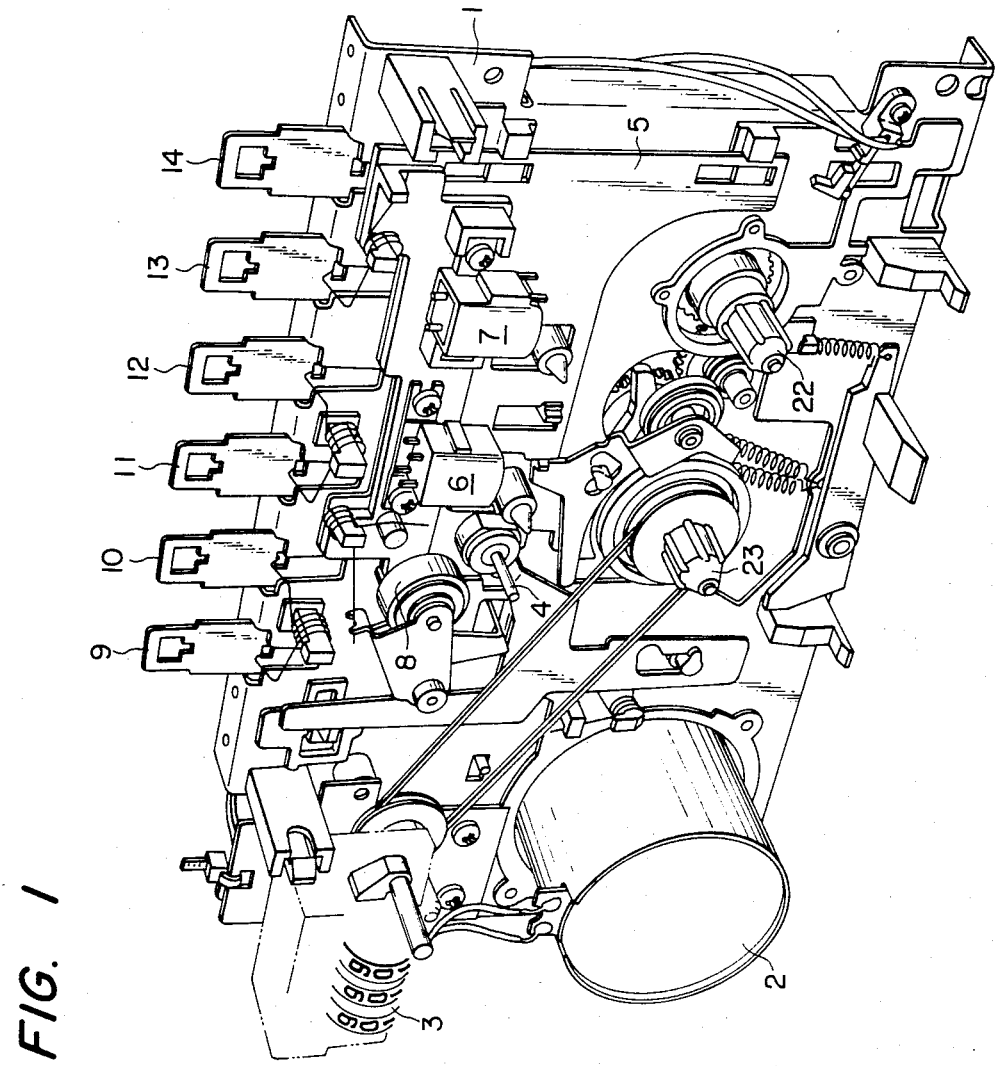
FIG. 1 is a perspective view showing one form of tape recorder to which this invention is applied.
Figure 2:
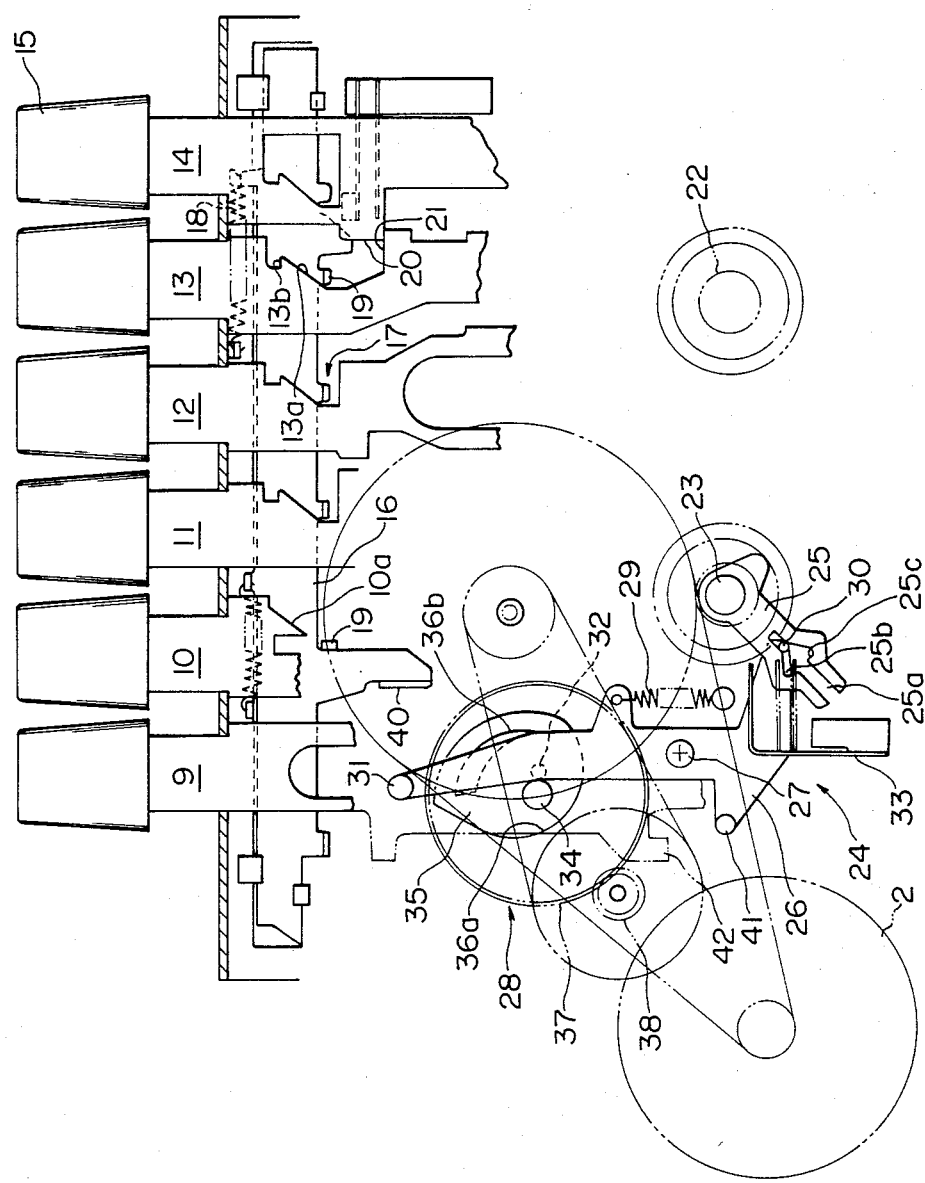
FIG. 2 is a front view showing the principal portions of an embodiment of an autostop apparatus of this invention.

The construction of this invention will now be described by way of the attached drawings. With reference to FIGS. 1 and 2, an outline of the overall tape recorder to which this invention is applied will be described. Reference numeral 1 designates a vertical chassis where a motor 2, a counter 3 and a capstan, belt-driven by the motor 2, are fixed. A head base plate 5 is mounted in such a manner as to be movable up and down. A recording and reproducing head 6, an erasing head 7 and a pinch roller 8 and the like are disposed on the head base plate 5.

The upper edge portion of the chassis 1 is provided with mode operating rods 9-14 for pause, stop, fast-forward, rewind, playback and recording operations, in order from left to right in the drawing. The rods vertically project thereon, such that when a finger pushes down on knobs (FIG. 2) mounted on the top portions of the operating rods, the tape recorder can be operated in a selected mode. A horizontal elongated lock plate 16 orthogonal to the moving direction of the rods during operation is stretched over the mode operation rods 9-14, disposed in a straight line in such a manner as to be movable to the right and left. A mode switching operation apparatus 17 is formed between the lock plate 16 and each mode operating rod except for the pause mode operating rod 9.

In the mode switching operating apparatus 17, as shown in FIG. 2, the lock plate 16 is adapted to move in either the right or left directions and is biased to one side. For example, in case of the playback mode operating rod 13, an engaging piece 19 is mounted in the vicinity of the rod. The rod 13 has a taper guide portion 13a on the right side which is inclined opposite to the bias direction of the lock plate 16 produced by the spring 18. A concave portion 13b is formed above the taper portion 13a, whereby when the mode operating rod 13 is pushed downwardly and operated, the engaging piece 19 is brought into contact with the taper portion 13a, which forces the lock plate 16 to temporarily move to the right against the force of the spring 18, and then past the taper portion 13a, to engage the concave portion 13b to retain the mode operating rod 13 in the operating condition.

The mode operating rods 11, 12, 13 and 14 for fast forward, rewinding, playback and recording, that are required to be retained, are also constructed in the same manner, including the moving direction of the lock plate 16 in case of engagement. Thus, since all the mode operating rods 11-14 operate identically, for the stop mode, the lock plate 16 may merely by moved to the right side to release the engaging pieces 19 from the concave portions. Accordingly, the stop mode operating rod 10 engages an engaging piece 19 similar to that described above, and has only a taper portion 10a for moving the lock plate 16 to the right on the right side thereof. The retention of the mode operating rods can thus be cancelled by operation of the engaging piece 19 and taper portion 10a.

The pause mode operating rod 9 is also required to be retained and released. But as this operation is performed separately from the above mode operations, means different from the lock plate 16 is used therefor.

A pressing projection 20 and a holder 21 are disposed between the recording mode operating rod 14 and the playback mode operating rod 13 in a manner so as to engage each other. In recording, the operation of the mode operating rod 14 causes the pressing projection 20 to engage the holder 21, so that the rod 13 is also moved and operated therewith.

A take-up reel shaft 23 and a pay-out reel shaft 22 are mounted side by side below a head base plate 5 of the chassis 1, and an autostop mechanism 24 of this invention is formed between the take-up reel shaft 23 and the lock plate 16 for retaining and releasing each mode.

The autostop mechanism 24 will be described with reference to FIG. 2. The take-up reel shaft 23 is provided with a reel arm 25 positioned diagonally to the lower left with a predetermined frictional resistance. Thereupon, while a tape of the cassette is fed, the reel arm 25 is rotated together with the rotation of the reel shaft 23, and when the tape end is reached and the tape is strained and overloaded, the reel arm 25 becomes substantially inactive or quiescent on the reel shaft 23. The end of the tape can be detected by such movement of the reel arm 25. The reel arm 25 has a linear slot 25a in a diametral direction. Reverse-heart-shaped cavities 25b, 25c are disposed midway along the slot 25a on both sides thereof. Against the reel arm 25, an autostop arm 26 is substantially perpendicularly disposed, with the intermediate portion thereof rotatably supported by a pivot 27. A cam mechanism 28 is disposed to overlap the upper portion of the autostop arm 26. A plate spring 33 is mounted between the autostop arm 26 and the reel arm 25.

The autostop arm 26 is urged clockwise by a spring 29, and is provided with a pin 30 mounted on the lower portion thereof, which is movably engaged in the slot 25a of the reel arm 25; and is further provided with a pin 31 for moving the lock plate on the upper end thereof and a pin 32 for engaging the cam mechanism 28 positioned between the pin 31 and the pivot 27. When the cassette is not set, the reel shaft 23 and the reel arm 25 are quite free, so that the autostop arm 26 is slightly turned to clockwise to bring the pin 30 into engagement with the left cavity 25b to be well-balanced. When the cassette is set and the reel shaft 23 is rotated counterclockwise for reeling and clockwise for unreeling, the reel arm 25 is tries to rotate together therewith and applies to the autostop arm 26 a returning force against the spring 29. The pin 30 moves out of the cavity 25b and engages a portion of the path 25a so as to locate the autostop arm 26 substantially vertically. When the tape of the cassette comes to an end and the reel shaft 23 stops, the reel arm 25 no longer has a rotational force applied thereto by the reel shaft 23. Consequently, the pin 30 moves over the cavities 25b, 25c and in the path 25a, whereby the autostop arm 26 can be largely moved clockwise by the spring 29.

The cam mechanism 28 comprises a gear 37 with a large diameter having a rotary shaft 34, which is provided with a cavity 35 having an eccentric cam surface 36a, the cavity 35 having another eccentric crescent cam surface 36b projected therein. The gear 37 engages with a gear 38 with a small diameter, and a belt forms a gear drive from gear 38 to the capstan fitted with a fly wheel, so that the cam surfaces 36a, 36b are rotated clockwise with large torque. When the pin 32 engages the cam surface 36b which increases gradually in eccentricity in the direction of rotation, it is strongly pushed outward with a power-doubling action, and when the pin 32 engages the cam surface 36a which decreases gradually in eccentricity in the direction of rotation, it is moved inward for a return action.

A pressing plate 40 integral with the lock plate 16 is disposed in the right side of the range of rotation of the upper end pin 31 of the autostop arm 26. When the cam mechanism 28 presses the autostop arm 26, the pin 31 strikes the pressing plate 40 to move the lock plate 16 to the right side.

The invention is constructed as described above. When, after setting the cassette, one of the fast forward, rewind, reproducing and recording modes is selected by presssing one of the mode operating rods 11-14, the recorder is retained in the operating condition by the lock plate 16 and the mode switching operation apparatus 17. The take-up reel shaft 23 is driven to rotate and feed the tape, and the above selected mode is continuously used.

Figure 4:
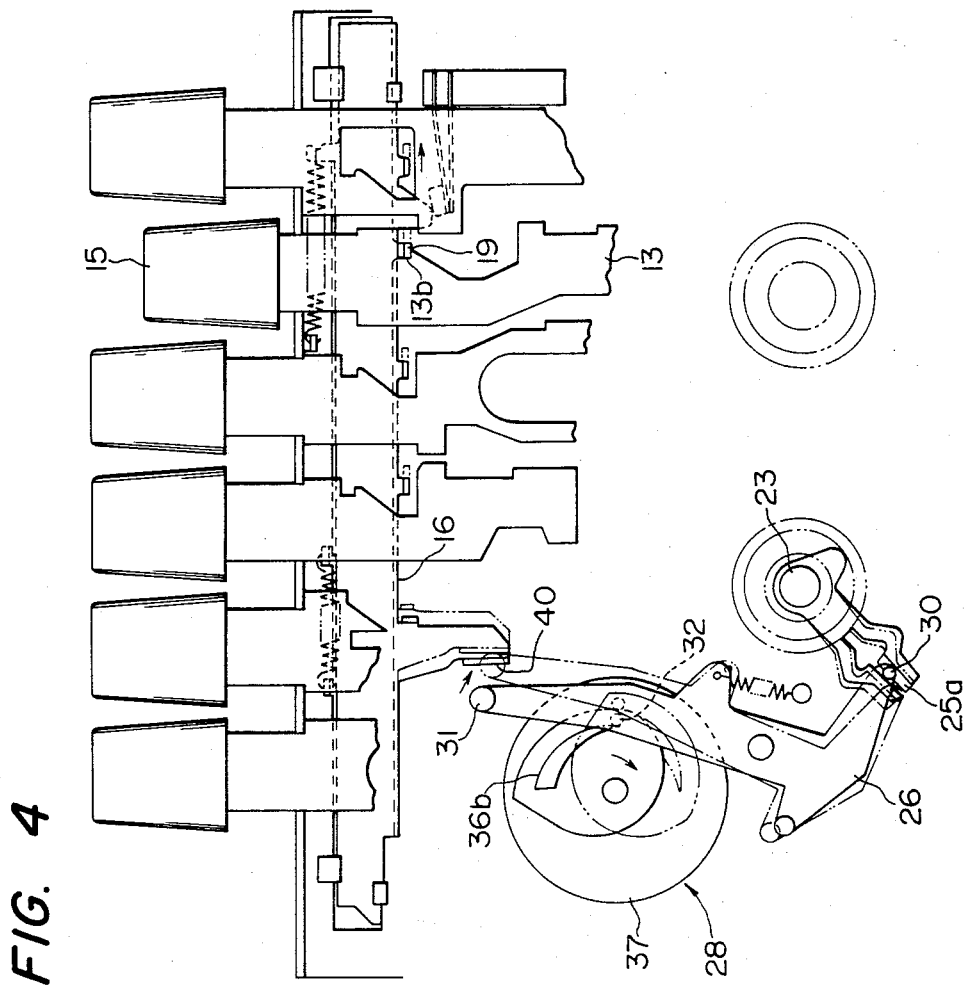

In such a tape transport condition, the reel arm 25 is rotated in the autostop mechanism 24 as shown in FIG. 2, which causes the autostop arm 26 to bring the pin 30 into engagement with the slot 25a of the reel arm 25 so as to be located substantially vertically. The intermediate pin 32 is positioned near the rotary shaft 34 inwardly of the cam surface 36b of the cam mechanism 28, and the upper end pin 31 is positioned far away from the pressing plate 40 so as to be inactive. When the feed of the tape is completed and the reel shaft 23 is stopped, the reel shaft causes the reel arm 25 to be nearly inactive, so that while the pin 30 is nearly linearly moved in the slot 25a of the reel arm 25, the autostop arm 26 is moved clockwise by the spring 29 and can be largely moved. When the autostop arm 26 moves in such a manner, the intermediate pin 32 approaches the rotating range of the cam mechanism 28, and the upper end cam 31 approaches the pressing plate until after a predetermined movement, the pin 32 engages the cam surface 36b, and the pin 31 strikes the pressing plate 40. Thereupon, as shown in FIG. 4, since the cam surface 36b is turned by the gears 37, 38 with large torque, the autostop arm 26 is turned strongly by the pushing action of the pin 32 caused by the cam surface 36b. Thus, the pressing plate 40 and the lock plate 16 are moved to the right by the pin 31, resisting the spring 18. This operation is the same as the stop mode operation. The engagement of the mode operating rod retained by the lock plate 16 is released, the driving system for the motor 2 is automatically stopped, and if the head base plate 5 was operated, it is restored to the inactive condition.

Figure 3A:
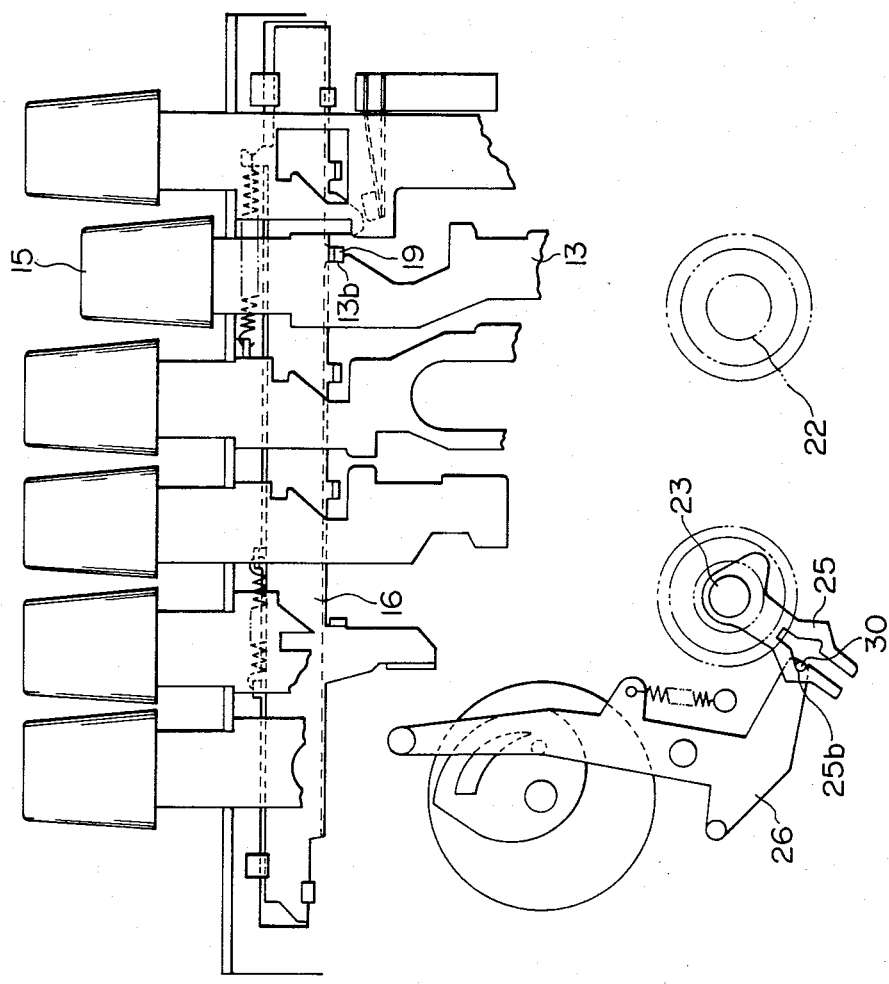
FIGS. 3(a), 3(b), FIG. 4 and FIG. 5 illustrate the operation of the device.
Figure 3B:
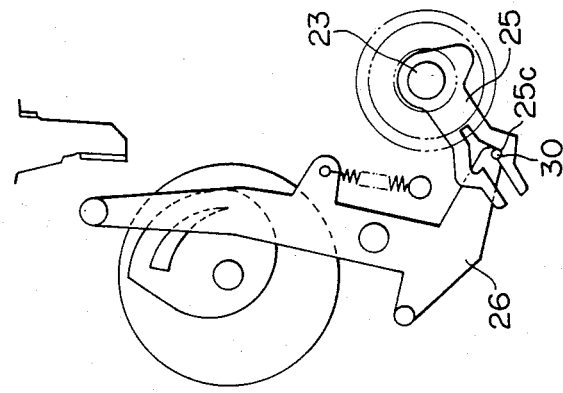

Subsequently, the action of the above cam surface 36b is performed, the automatic release is accomplished in an instant, and then the restitution of the lock plate 16 forces the autostop arm 26 to turn to the left. Whereupon, the intermediate pin 32 is further moved inwards by the cam surface 36a, which promotes the restitution of the autostop arm 26. At this time, the pin 30 advances inwardly in the slot of the reel arm 25 in a free condition. As shown in FIGS. 3 (a) and 3 (b), when the pin 30 engages the cavity 25b or the cavity 25c of the reel arm 25, the autostop arm 26 is retained so as to be well-balanced and stable.

It will be apparent that, as described above, the autostop mechanism of the tape recorder of this invention is adapted to detect when tape transport comes to an end by movement of the reel arm 25 mounted on the reel shaft 23 of the take-up reel with a predetermined frictional resistance, so that this mechanism is applicable to every cassette, and performs detection with high accuracy. The movement of the reel arm 25 causes the autostop arm 26 to be operated, which is doubled in power by the cam mechanism 28, whereby the release movement can be mechanically accomplished by means of the autostop arm 26 directly and assuredly, which is structurally advantageous. The cam mechanism 28 has the function of returning the autostop arm 26. Since the reel arm 25 is provided with means engaging the autostop arm 26 when the cassette is not set, the autostop arm 26 returns rapidly after the releasing movement to a stable position, and causes no malfunction. When the tape of the cassette comes to an end, the operating rod of the retained mode is released as the stop mode is executed, so that the cassette can be taken out immediately, resulting in operational simplicity.

Figure 5:
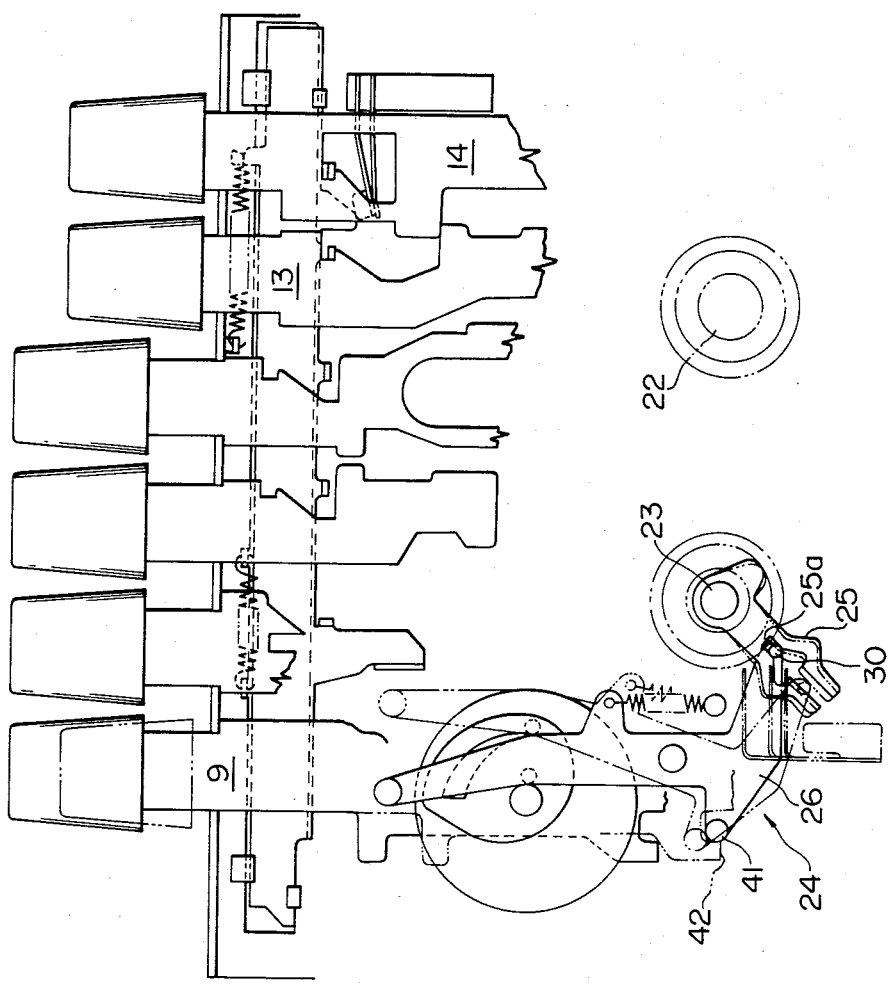

As shown in FIG. 5, a tape slack preventing apparatus is fitted in the autostop mechanism 24. The autostop arm 26 is provided with a fourth pin 41 which is positioned close to the pivot 27. A hook 42 of the pause mode operating rod 9 is opposed to the pin 41 in such a manner as to engage therewith.

With the device constructed as described above, when for instance, the recording mode operating rod 14 is pressed after setting the cassette, the playback mode operating rod 13 is operated together therewith, and rods 13, 14 are retained by the lock plate 16 and the mode switching operation apparatus 17. Then, the head base plate 5 is operated, and the capstan 4, the pinch roller 8 and the take-up reel shaft 23 are driven to feed a tape, whereby the use of the recording mode is continued.

In such condition, in the autostop mechanism 24, the reel arm 25 tries to rotate and applies to the autostop arm 26 a force acting against the spring 29, which causes the pin 30 of the autostop arm 26 to leave the cavity 25b and engage in the linear slot 25a, whereby the autostop arm 26 is positioned substantially vertically and balanced.

As shown in FIG. 5, when the pause mode operating rod 9 is pressed, the hook 42 of the rod 9 engages the pin 41 to lock the autostop arm 26, so that the pin 30 moves deep into the slot 25a of the reel arm 25 and is in engagement therewith. Accordingly, the reel arm 25 itself is locked by the pin 30 so as not to be rotated, whereby the reel shaft 23 is braked by the predetermined frictional resistance between the reel shaft 23 and the reel arm 25. Thus, when the capstan 4 and the reel shaft 23 are stopped by pause mode operation, the inertia of the tape is absorbed by the braking of the reel shaft 23. Subsequently, when the pause mode is cancelled and the mode operating rod 9 retracts, the described autostop arm 26 and the reel arm 25 are unlocked and restored to their original states. When the recording mode is cancelled by the stop mode operation, the reel arm 25 becomes quite free, and the pin 30 engages with the cavity 25b, but when the pause mode operation is cancelled, the pin 30 will not return to the cavity 25b, but will be in the normal operating condition position from the begining.

It will be apparent that as described above, the invention can provide a structurally simple tape slack prevention apparatus for a tape recorder which is adapted to absorb the inertia of the tape while the take-up reel is stopped, with braking applied at the time of the pause mode operation, so as to prevent the tape from slackening and overcome various disadvantages in respect of handling.

What is claimed is:

1. An autostop mechanism for a tape recorder, comprising;
   a reel arm fixed on a reel shaft of a take-up reel of said tape recorder so as to be rotatable therewith,
   engagement means formed on said reel arm,
   first means for engaging said reel arm engagement means, an autostop arm pivoted about a pivot point located at an intermediate portion of said autostop arm and means biasing said autostop arm in one direction,
   second means for releasing a mode switching operation apparatus,
   third means disposed between said first and second means, and provided with a cam mechanism for effecting said releasing operation.

2. A device as claimed in claim 1, said reel arm being frictionally engaged with said reel shaft.

3. A device as claimed in claim 2, said first means comprising a pin formed on said autostop arm, and said engagement means comprising slot means formed in said reel arm, said reel arm exerting a force on said autostop arm via the connection between said pin and said slot means when said reel shaft is rotated, said force being opposite to the bias direction of said arm.

4. A device as claimed in claim 3, said force being substantially eliminated when said reel shaft does not rotate, whereby said autostop arm is moved in said bias direction.

5. A device as claimed in claim 4, further including a lock plate for retaining a selected operating mode, said second means comprising means for moving said lock plate in a direction for releasing a retained mode.

6. A device as claimed in claim 5, said third means comprising a cam follower engageable with a pair of cam surfaces, one said cam surface urging said follower in a direction causing said lock plate moving means to engage said lock plate, and the other said cam surface urging said follower in a return direction.

7. A device as claimed in claim 6, wherein when said reel shaft is stopped, said autostop arm is moved in said bias direction whereby said third means engages said one cam surface, said one cam surface urging said lock plate moving means into contact with said lock plate to move the same to release said retained mode, said one cam surface having a profile such that said follower disengages said one cam after said release, said second cam surface urging said follower in said return direction after said disengagement.

8. A device as claimed in claim 1, including means for locking said autostop arm and said reel arm, said means comprising fourth means arranged on said autostop arm for engaging pause means, said pause means urging said fourth means in a direction pivoting said autostop arm against a bias direction of said arm.

9. A device as claimed in claim 1, said engagement means comprising slot means formed in said reel arm and including a cavity formed in a midportion of said slot.

10. A device as claimed in claim 1 or 2, said first, second and third means each comprising pins mounted on said autostop arm.

11. A tape slack preventing apparatus for a tape recorder, comprising; an autostop mechanism including an autostop arm, a reel arm fixed to a take-up reel shaft with a predetermined frictional resistance, said autostop arm having a pin engaged with said reel arm, and means for locking said reel arm together with said autostop arm in response to a pause mode operation, whereby during said pause mode operation, braking is applied to said take-up reel shaft by locking said reel arm.

12. A tape slack preventing apparatus as claimed in claim 11, said locking means comprising pause mode actuator means including abutment means for engaging said autostop arm at an engagement means thereof.

13. A tape slack preventing apparatus as claimed in claim 12, said reel arm including a slot for receiving said pin, said pin being urged toward an end of said slot in response to operation of said actuator means.

14. A tape slack preventing apparatus as claimed in claim 13, said autostop arm being locked by said actuator means, and said reel arm being locked by said pin, whereby said predetermined frictional resistance brakes said reel shaft with respect to said reel arm.

* * * * *